US010931140B2

United States Patent
Hadler-Jacobsen et al.

(12) United States Patent
(10) Patent No.: US 10,931,140 B2
(45) Date of Patent: Feb. 23, 2021

(54) SUPPLY OF AUXILIARY POWER TO REMOTE INSTALLATIONS

(71) Applicant: OneSubsea IP UK Limited, London (GB)

(72) Inventors: Aage Hadler-Jacobsen, Nesttun (NO); Audun Magne Askeland, Bergen (NO)

(73) Assignee: OneSubsea IP UK Limited, London (GB)

( * ) Notice: Subject to any disclaimer, the term of this patent is extended or adjusted under 35 U.S.C. 154(b) by 126 days.

(21) Appl. No.: 15/497,615

(22) Filed: Apr. 26, 2017

(65) Prior Publication Data

US 2017/0324273 A1 Nov. 9, 2017

Related U.S. Application Data

(60) Provisional application No. 62/332,343, filed on May 5, 2016.

(51) Int. Cl.

| | |
|---|---|
| ***H02J 3/02*** | (2006.01) |
| ***H02J 13/00*** | (2006.01) |
| ***E21B 33/035*** | (2006.01) |
| ***H02J 3/34*** | (2006.01) |
| ***H02J 3/32*** | (2006.01) |
| ***H02K 5/132*** | (2006.01) |
| ***H02P 31/00*** | (2006.01) |

(52) U.S. Cl.

CPC .......... *H02J 13/00* (2013.01); *E21B 33/0355* (2013.01); *H02J 3/02* (2013.01); *H02J 3/32* (2013.01); *H02J 3/34* (2013.01); *H02K 5/132* (2013.01); *H02P 31/00* (2013.01)

(58) Field of Classification Search

CPC .................................. H02J 13/00; H02J 3/02
USPC ......................................................... 307/1–3
See application file for complete search history.

(56) References Cited

U.S. PATENT DOCUMENTS

| | | | | |
|---|---|---|---|---|
| 8,138,622 | B2 * | 3/2012 | Layton ................ | G01V 11/002 307/3 |
| 2009/0200035 | A1 * | 8/2009 | Bjerkreim .............. | E21B 43/01 166/335 |
| 2011/0304289 | A1 * | 12/2011 | Burdick ............. | H02J 13/0096 318/400.3 |
| 2012/0181853 | A1 * | 7/2012 | Polese ...................... | H02J 3/02 307/2 |
| 2013/0044522 | A1 * | 2/2013 | Anghel .................... | H02J 3/26 363/35 |
| 2013/0169044 | A1 | 7/2013 | Stinessen et al. | |

(Continued)

FOREIGN PATENT DOCUMENTS

| | | | | |
|---|---|---|---|---|
| JP | 2016054574 A * | 4/2016 | ................ | H02J 3/00 |
| WO | 2007055587 A1 | 5/2007 | | |
| WO | 2012164029 A2 | 12/2012 | | |

OTHER PUBLICATIONS

Extended Search Report issued in European Patent Appl. No. 17169556.2 dated Oct. 9, 2017; 6 pages.

*Primary Examiner* — Adi Amrany
(74) *Attorney, Agent, or Firm* — Helene Raybaud

(57) ABSTRACT

The present disclosure relates to system and method used to transmit power to a remote location. More specifically, the present disclosure relates to a system and method used to independently energize control and monitoring functions of a remote installation prior to and/or during energizing its main circuit.

20 Claims, 8 Drawing Sheets

From Supply (Fixed or variable frequency)
520
CF Blocking Air Core Inductors
108
522
5 leg 2-Winding + HF CM Winding
112
CF PSU
510
524
GND
132
550
132
550
5 leg 2-Winding + CM Winding
140
A B C
540
532
CF SPM
530
HF
542
HF
GND
536
120
534
n
544
552
HRG
GND
a b c
Main Power to Pump Motor or Other Large Load(s)

(56) References Cited

U.S. PATENT DOCUMENTS

2013/0286550 A1* 10/2013 Hazel ..................... H02B 7/00 361/673
2015/0159797 A1* 6/2015 Baker ..................... H02M 7/043 138/33
2016/0011575 A1* 1/2016 Liu ..................... H02J 11/00 700/296
2017/0063270 A1* 3/2017 Normann ..................... H02J 3/00
2017/0170664 A1* 6/2017 Minegishi ..................... H02M 3/3376
2017/0373581 A1* 12/2017 Hadler-Jacobsen ..................... H02K 7/1823
2018/0223854 A1* 8/2018 Brunvold ..................... F04D 1/066

* cited by examiner

From Supply (Fixed or variable frequency)
a
b
c
320
112
DC or VLF PSU
310
312
IS1
N
324
GS1
314
322
A
B
C
132
350
132
SPM
330
336
+
N'
340
A
B
C
a'
b'
c'
342
SCM
334
Rectifier and DC Conditioner
332
+
-
120
344
n
HRG
a
b
c
350
Main Power to Pump Motor or Other Large Load(s)

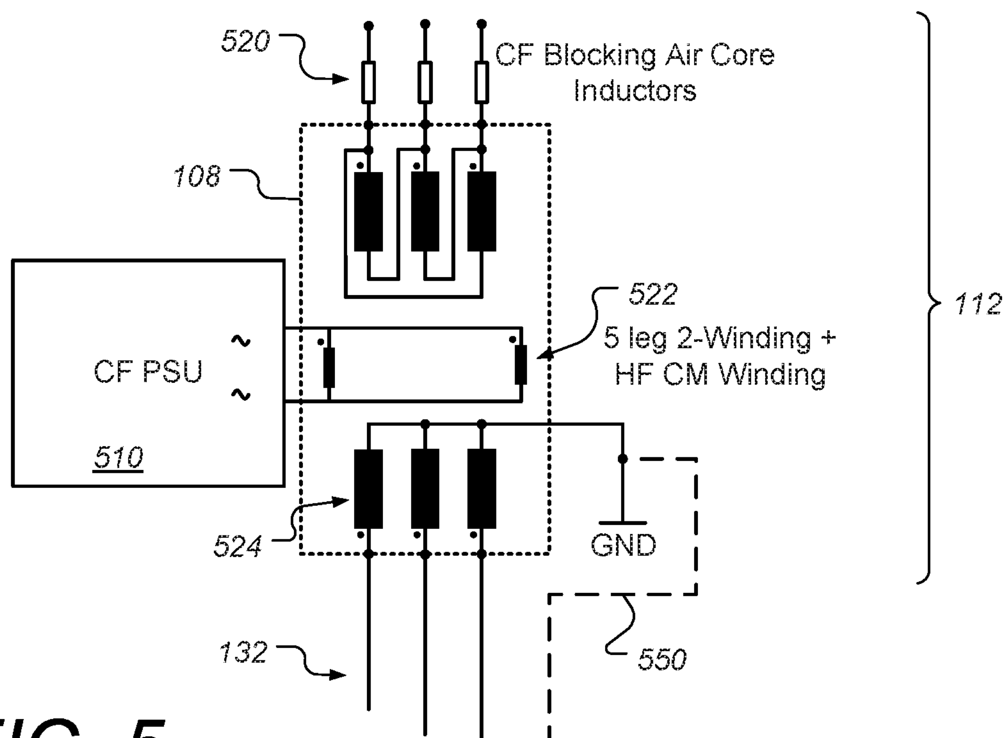
FIG. 5
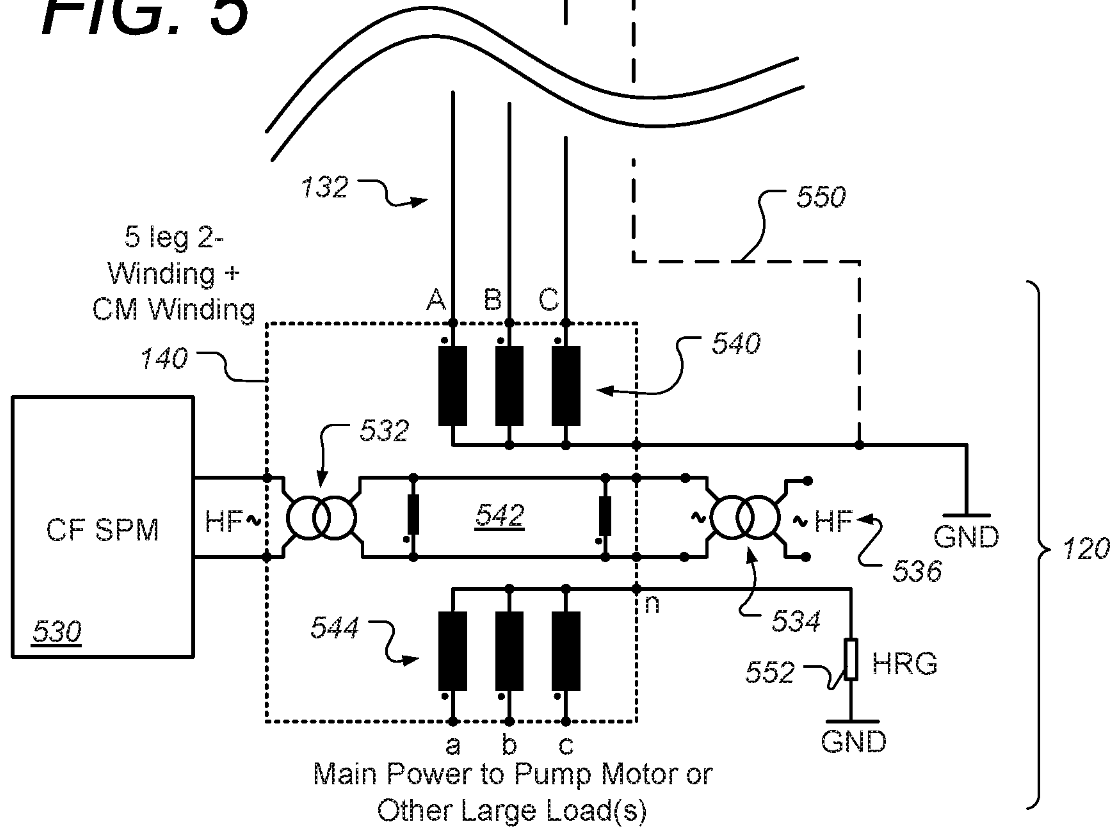

From Supply (Fixed or variable frequency)
520
CF Blocking Air Core Inductors
108
112
522
5 leg 2-Winding + HF CM Winding
CF PSU
510
524
132
850

132
850
A
B
C
3 leg 3-Winding ZigZag Connection
140
840
832
834
120
CF SPM
530
HF ~
N
n
Auxiliary Power
HRG
GND
a
b
c
Main Power to Pump Motor or Other Large Load(s)

SUPPLY OF AUXILIARY POWER TO REMOTE INSTALLATIONS

REFERENCE TO RELATED APPLICATIONS

This patent application claims the benefit of and incorporates by reference U.S. Provisional Patent Application Ser. No. 62/332,343 filed on May 5, 2016.

TECHNICAL FIELD

The present disclosure relates to a system and method used to transmit power to a remote location. More specifically, the present disclosure relates to a system and method used to energize control and monitoring functions or other single-phase loads of a remote installation, both prior to and during energizing its main circuit.

BACKGROUND

In the subsea oil and gas industry, it is often desirable to perform certain fluid processing activities on the sea floor. Examples include fluid pumps (both single phase and multiphase) and compressors (both gas compressors and "wet gas" compressors). The subsea pumps and compressors are commonly driven with electric motors, which might be induction or permanent magnet type, supplied by three-phase electrical power via one or more umbilical cables from a surface or onshore facility.

In these subsea systems, or more generally in any system where equipment is located in remote places with its power supply through 3 single cores or a three phase cable, it might be preferable to energize control and monitoring functions and other single phase loads of the system, with an auxiliary power supply prior to energizing the main (High (HV) or Medium (MV) Voltage) circuit. By energizing an auxiliary circuit prior to the main circuit, status, monitoring and control signals and auxiliary power for operation of actuators and other loads might be transmitted to and from the remote location in an orderly way.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments a system is described for energizing an auxiliary system that supports operation of a main load (e.g. a drive motor or a subsea distribution switchgear), with both the auxiliary system and main load being located at a remote location. The system includes: three long-distance current-carrying conductors running between a nearby location and the remote location; a step-up transformer at the nearby location configured to increase voltage of the three-phase electrical power for transmission over the three long-distance conductors; a step-down transformer at the remote location configured to decrease voltage of the three-phase electrical power from the three long-distance conductors for use by the main load; an auxiliary power supply system located at the nearby location configured to transmit auxiliary electrical power on the three long-distance conductors; and an auxiliary power extraction system located at the remote location configured to extract electrical power that is transmitted on the three long-distance conductors and to energize the auxiliary system with said extracted electrical power.

According to some embodiments, the auxiliary system includes control electronics, actuated devices such as valves, circuit breakers and switches, and/or equipment configured to monitor one or more parameters at the remote location. When the auxiliary system is energized prior energizing the main drive motor, the auxiliary electrical power is transmitted on the three long-distance conductors, and when the auxiliary system is energized while the main load is also being energized, the auxiliary power can be superimposed on the three-phase electrical power used by the main load.

According to some embodiments, the auxiliary power supply system is further configured to transmit the auxiliary electrical power as alternating current, in some cases as zero sequence AC and at a frequency independent of the main load and optimized for each individual system. In some cases this independent frequency is higher than the main load frequency. Either of the step-up and the step-down transformers can be configured as a five-leg transformer or as a 3-leg transformer having secondary high voltage windings arranged in zig-zag layout.

According to some embodiments, the auxiliary electrical power is transmitted in zero sequence and at a lower frequency than used to energize the main drive motor, or in some cases as direct current.

According to some embodiments, the auxiliary power supply system in further configured to transmit at least 1000 watts of auxiliary electrical power and/or the three long-distance conductors are at least 20 kilometers in length.

According to some embodiments, the remote location is a subsea fluid processing station where the main load is configured to drive a subsea pump, compressor or separator, the nearby location is a surface facility, and the three long-distance conductors are housed in one or more umbilical cables running from the surface facility to the subsea fluid processing station.

According to some embodiments, a method is described for energizing an auxiliary system that supports operation of a main load, with both being located at a remote location. The method includes: transmitting auxiliary electrical power from a nearby location to the remote location over three long-distance conductors running between the near nearby and remote locations which are configured to supply high-voltage three-phase electrical power for rotating the main load; and at the remote location extracting auxiliary electrical power being transmitted over the conductors and energizing the auxiliary system with the extracted electrical power.

According to some embodiments, a step-up transformer is used at the nearby location having a grounded neutral node and is configured to increase voltage of the three-phase electrical power for transmission over the three long-distance conductors, and a step-down transformer is used at the remote location that is configured to decrease voltage of the three-phase electrical power from the three long-distance conductors for use by the main load.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

FIG. 5 is a schematic diagram showing further detail of a system for supplying auxiliary power to a remote installation using a common mode AC carrier frequency (CF), according to some embodiments;

DETAILED DESCRIPTION

The particulars shown herein are for purposes of illustrative discussion of the embodiments of the present disclosure only. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

According to some embodiments, systems and methods are described that energize an auxiliary circuit system of a remote installation prior to energizing the main circuit of the installation.

According to some embodiments, the auxiliary circuit power is transmitted, superimposed on HV or MV main power transmission cables, wherein the auxiliary circuit functions include powering a plurality of equipment, in a remote location. The auxiliary power can be superimposed, either as a DC or low frequency AC, onto the MV or HV line as a common mode voltage with ground as reference and return path or as a fixed or variable carrier frequency system, coupled and de-coupled by a zero sequence network in the transformers in either end of the transmission line, as will be further detailed below.

According to some embodiments, systems are described that include: a DC or Very Low Frequency system to be used before a main load is energized and a carrier frequency based system that can provide auxiliary power regardless the state of the main load operation.

According to some embodiments, the DC or Very Low Frequency system, which may be a low cost alternative, might be used prior to operation of a main load. Once the main motor has been energized, the subsea control system will draw its power from the main load power circuit.

According to some embodiments, Carrier Frequency (CF) alternatives might be used both before and during operation of the main load without interacting with each other. In embodiments, alternative carrier frequency system principles are proposed. Both systems might be based on zero-sequence components. According to some embodiments, the coupling between the main and the auxiliary systems might be galvanic or inductive.

According to some embodiments, an auxiliary power transmission on Medium Voltage (MV) or High Voltage (HV) lines might be used as a means of powering a subsea control system prior to energizing the main load power. The auxiliary power might be used to power the subsea control system in order to relay status and operation signals between topside and subsea stations, but might also have the capacity to provide power to operate electric actuators and other single phase consumers such as heat tracing etc.

Figure 1:
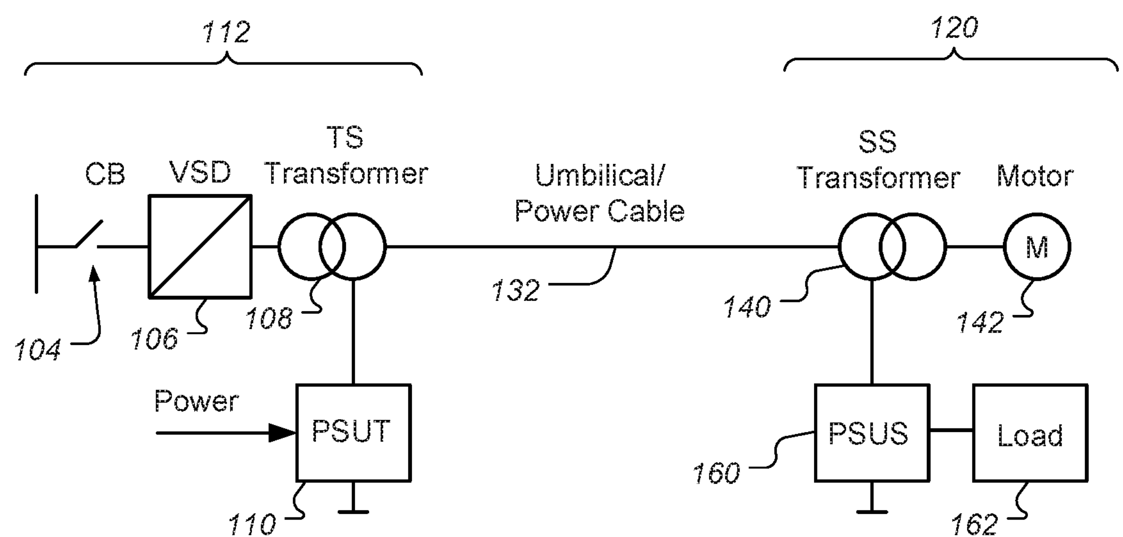
FIG. 1 is a schematic diagram of a system for supplying auxiliary power to a remote installation, according to some embodiments.

FIG. 1 is a schematic diagram of a system for supplying auxiliary power to a remote installation, according to some embodiments. The auxiliary power is supplied over power conductors used to supply power to remote system, for example a motor at the remote installation. In some embodiments, the remote installation is a sub-sea installation that receives power from a topside facility. In the example shown, topside facility 112 is configured to transmit main power through an umbilical line(s) 132 to a remote subsea station 120. In some cases, an umbilical may not be needed between the topside facility 112 and subsea station 120. In such cases the main power can instead be transmitted through a three-phase power cable. References to umbilical 132 and power cable 132 are therefore used interchangeably herein. A topside circuit breaker 104 is configured to make/break connection to a main power supply (either fixed or variable frequency). Variable speed drive 106 is configured to supply three-phase power at variable frequencies to drive the subsea load, which in this case is a subsea motor 142. By varying the three-phase power frequency, the speed of the motor is controlled. The main drive power is stepped up to a higher voltage using topside transformer 108 and then stepped down to the appropriate subsea load voltage using subsea transformer 140. In some examples, the subsea distribution switchgear arrangement may be used at the subsea location 120. In such cases the topside variable speed drive 106 may not be used and the subsea distribution switchgear represents the main load, rather than motor 142. All references herein to motor 142 can also refer to a main load 142. The auxiliary load 162 in the subsea location is supplied separately from the main motor 142 although the auxiliary power is transmitted over the same three phase power conductors in umbilical 132. Auxiliary power is received by topside power supply unit 110, which supplies the auxiliary power through the umbilical 132 via topside transformer 108. Similarly, the subsea power supply unit 160 receives the auxiliary power via subsea transformer 140 and supplies the auxiliary power to the auxiliary load 162. According to some embodiments, auxiliary load 162 is a control circuit configured to provide communication and control commands to a pump module in the subsea station 120. In some cases the load 162 is used for providing an active check on the control circuit, actuation of valves and other functions so as to verify system functionality and status. Examples of load 162 include one or more of the following: control electronics, actuated devices such as valves, circuit breakers and switches, and/or equipment configured to monitor one or more parameters at the remote location.

Figure 2:
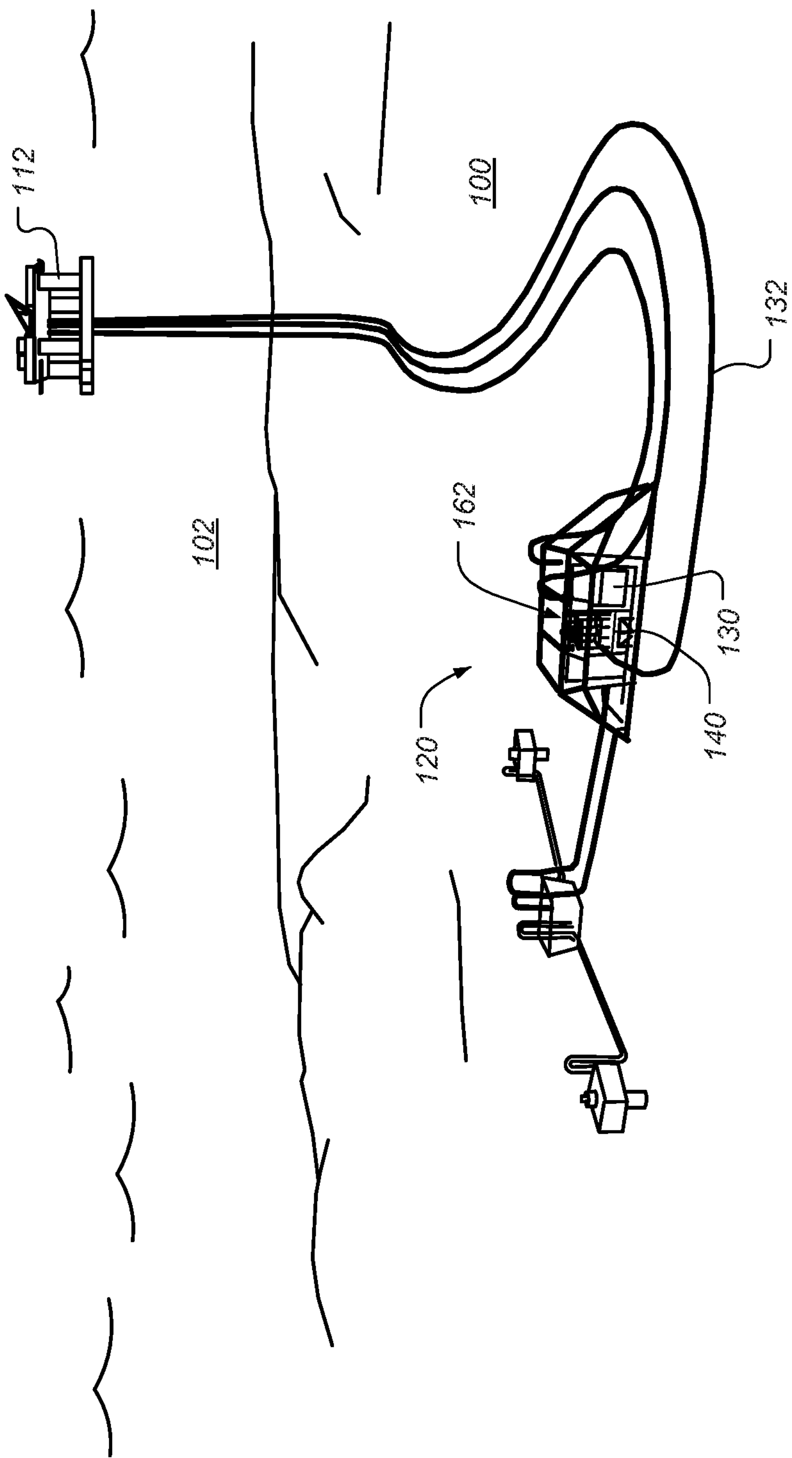
FIG. 2 is a diagram illustrating a subsea environment in a system for supplying auxiliary power to a remote installation can be deployed, according to some embodiments.

FIG. 2 is a diagram illustrating a subsea environment in a system for supplying auxiliary power to a remote installation can be deployed, according to some embodiments. On sea floor 100 a station 120 is shown which is downstream of several wellheads being used, for example, to produce hydrocarbon-bearing fluid from a subterranean rock formation. Station 120 includes a subsea pump module 130, which has a pump (or compressor) that is driven by one or more electric motors (such as motor 142 shown in FIG. 1). The station 120 is connected to one or more umbilical cables, such as umbilical 132. The umbilical in this case are being run from topside facility 112, which is a platform, through seawater 102, along sea floor 100 and to station 120. In other cases, topside facility 112 from which umbilical 132 may be run can be another type of surface facility such as a floating production, storage and offloading unit (FPSO), or a shore-based facility. In many cases to reduce energy losses, it is desirable to transmit energy through the umbilical at higher voltages than is used by the electric motor in pump module 130. In such cases topside facility 112 includes a step-up transformer (such as transformer 108 shown in FIG. 1), and station 120 might include a step-down transformer 140. Step-down transformer 140 is configured to convert the higher-voltage three-phase power being transmitted over the umbilical 132 to lower-voltage three-phase power for use by pump module 130. In addition to pump module 130 and transformer 140, the station 120 can include various other types of subsea equipment, including other pumps and/or compressors. The umbilical 132 can also be used to supply barrier and other fluids, and control and data lines for use with the subsea equipment in station 120. Note that although transformer 140 might be referred to herein as a three-phase step-down transformer, the techniques described herein are equally applicable to other types of subsea transformers such as having other numbers of phases, and being of other types (e.g. step-up transformer, isolation transformer or autotransformer etc.).

The station 120 further comprises a control circuit 160 which might also be powered by the umbilical 132 via the transformer 140. The control circuit 162 provides communication and control commands to the pump module 130 and other subsea equipment that may be made part of the station 120. In such subsea systems, involving medium and high voltage equipment of complex character, it may be beneficial to energize the control circuit 162 of the system prior to applying the main power to start the pump module 130 and other high-energy consuming equipment on the sea floor or downhole. This way, an active check might be performed on the control circuit and operation of valves and other functions can be performed to verify system functionality and status. Dependent on the power system configuration, alternative ways of providing the auxiliary power can be used.

In some cases, such as where the step out distance (e.g. from topside facility 112 to station 120) is short to medium length and where the control system is electrohydraulic, the power requirement in the subsea control module may be limited and a dedicated single pair power cable can be included in the umbilical to provide full time power to all functions. However, with all-electrical control systems with large control or auxiliary power requirement or where the step-out distance is long, a dedicated low-voltage (LV) small power cable might be insufficient to supply the required power. By utilizing the HV power cable, intended primarily to energize the main pump motor, no practical power limit for the all-electric control system exists. According to some embodiments of the disclosure, wherein the control system requires power in the kW-range rather in the W-range, an auxiliary power supply via the main MV or HV cable is described. A benefit of using the main cable is that all system components have been qualified for HV operation. Moreover, the 3-phase HV cable system can be utilized even when the pump or load is at standstill. The control circuit 162 might be energized prior to the remainder of the subsea equipment by using Direct Current (DC), Very Low Frequency (VLF), power frequency or Carrier Frequency (CF) transmission, with one or more phases as active line and a separate conductor, cable screen or ground as return line between PSUT 110 and PSUS 160 (shown in FIG. 1). Several methods to provide the required power transmission are described. In some embodiments, no galvanic connection between HV power and control systems exists.

In embodiment wherein the power system comprises transformers connected in star configuration, where the three phase winding neutral points may be made accessible, both at sending end and receiving end, the neutral point of the transformers can be utilized as connection points for auxiliary power supply while the main motor power circuit is not energized. The control circuit 162 might be energized prior to the remainder of the subsea equipment by means of a common mode direct current (DC) or very low frequency (VLF) using transformer neutral points as active line connections and cable screen/ground as return line between Power Supply Unit Topside [PSUT] and Power Supply Unit Subsea [PSUS] units. An example of this principle is shown in FIG. 3.

Figure 3:
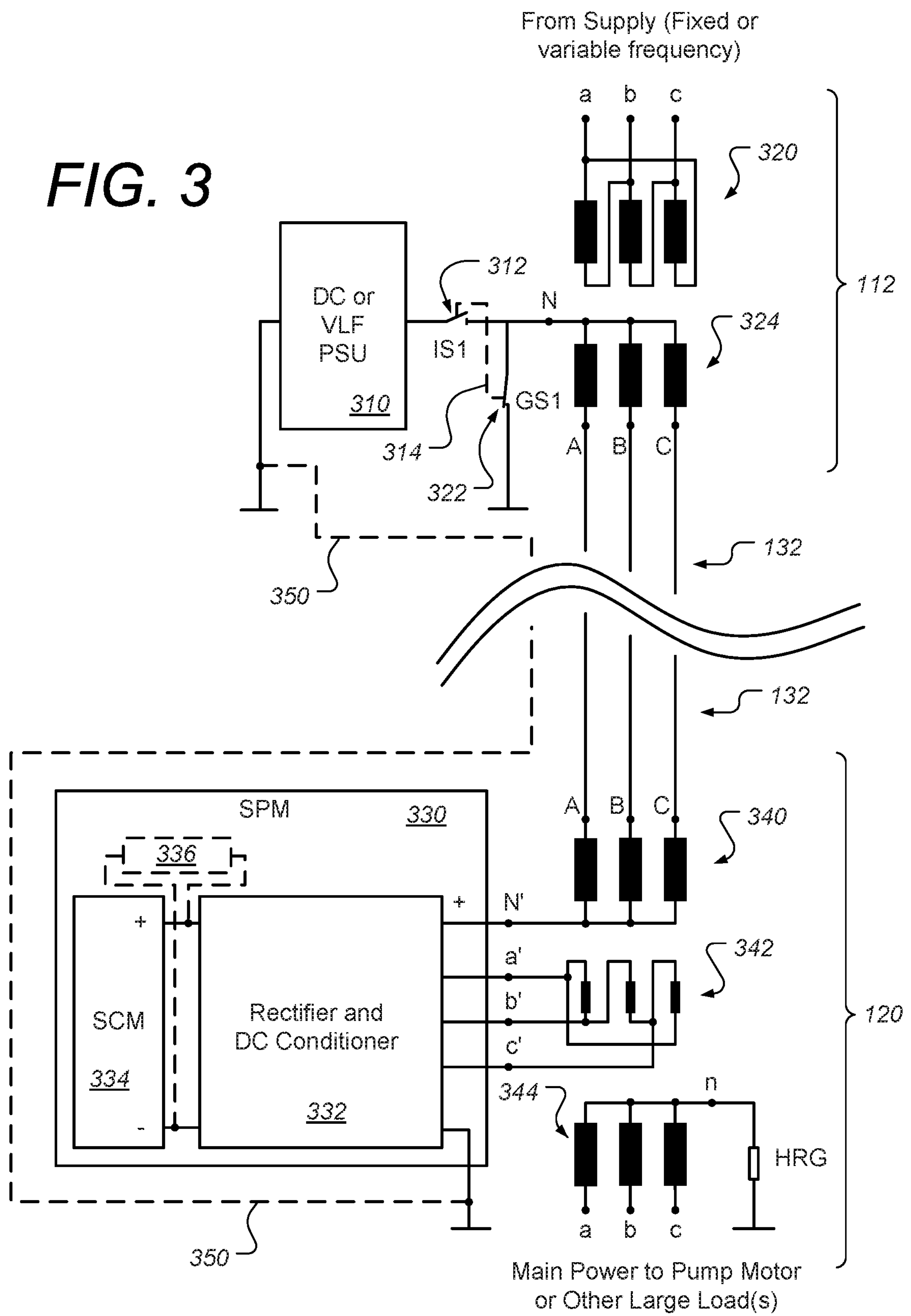
FIG. 3 is a schematic diagram showing further detail of a system for supplying direct current (DC) or very low frequency (VLF) power to a remote installation, according to some embodiments.

FIG. 3 is a schematic diagram showing further detail of a system for supplying DC or VLF power to a remote installation, according to some embodiments. In the example shown the AC-DC system has two modes of operation: one when the main power transmission system is not energized and one when the main power supply is energized.

Starting with de-energized main power, the neutral grounding switch GS1 (322) is open and the auxiliary power isolation switch IS1 (312) is closed. Located at the topside facility 112 are the DC or VLF PSU 310, which corresponds to PSUT 110 in FIG. 1, a topside three-phase step-up transformer, which corresponds to transformer 108 in FIG. 1, having primary windings 320 and secondary windings 324. The auxiliary voltage from PSU 310 will be applied between the transformer secondary neutral point N and Ground. According to some embodiments, the auxiliary power from PSU 310 is conducted in parallel through the three phases in the umbilical cable 132 to the subsea station 120. In station 120 the subsea step-down transformer (corresponding to transformer 140), the three received currents are summed in the neutral point N' of primary windings 340. The auxiliary current may cause an offset in the transformer magnetic operating point, but since the auxiliary power source is disconnected prior to operating the transformer through the main power circuit, this might not affect the performance of the transformer in normal operation.

According to some embodiments, a common mode DC or VLF configuration can be used where both the topside and subsea transformers have wye-connected HV windings, such as shown in the example of FIG. 3. In cases where one or both the transformers have delta-connected HV windings, the DC or VLF current can be injected via a wye- or zig-zag-connected inductor bank. An inductor bank (not shown) enables blockage of the HV power frequency, but pass the DC or VLF common mode current. According to some embodiments, a zig-zag connected inductor bank is used, which allows for minimization of the zero sequence impedance while simultaneously limiting the power frequency loss.

According to some embodiments, as an alternative to zig-zag connected inductor bank, one or both transformers can be made with zig-zag connected windings. Further details of such configurations are provided infra.

In some subsea applications using a subsea main motor, the HV transmission circuit may be directly grounded via GS1 (322). An example of this mode of operation will be discussed further infra. To provide power to the Subsea Control System, while the main motor is not energized, the grounding switch GS1 (322) can be disconnected and the isolation switch IS1 (312) closed. According to some embodiments, an interlock 314 can be provided to prevent both GS1 (322) and IS1 (312) to be closed at the same time. In the example described supra, a DC voltage is applied between the transformer neutral point (N) and ground. A DC current may flow via the neutral point and split equally between the HV transformer windings 324, the 3 cable cores in umbilical 132 to the subsea transformer HV windings 340. The three currents can be summed in the subsea transformer neutral point N' and pass through the rectifier and DC conditioning network 332. The DC voltage will appear across the Subsea Power Module (SPM) 330 and ground (GND) to energize the Subsea Control Module (SCM) 334. According to some embodiments, the SPM 330 is equipped with a ride-through battery 336 configured to provide sufficient power to the SCM 334 during transient conditions, e.g. when starting the pump motor. According to some embodiments, to limit the charging inrush current to the battery 336, a current limiting device (not shown) is connected in series with the battery 336. The discharge from the battery 336 can be passed through a discharge device (not shown) controlling the current within predetermined limits.

As an alternative to DC current, according to some embodiments, the off-line current can be supplied by PSU 310 in the form of a low frequency (LF) or very low frequency (VLF) voltage. A LF or VLF solution might be used where the subsea grounding system has a seawater return to reduce or avoid issues with galvanic corrosion.

Before energizing the main motor power system, IS1 (312) will open and GS1 (322) will close. The HV power transmission lines might be considered as a directly grounded power system. The subsea transformer has a $3^{rd}$ auxiliary winding 342, here shown as a Delta-winding, wherein 3 phases are connected to rectifier 332. The secondary winding 344 are also shown and supply the main power the pump motor (or other load). The auxiliary secondary voltage will vary in voltage level and frequency with the main motor speed, in cases there the main power supply is variable frequency motor power. The input voltage requirement for a SPM 330 may be configured to be very flexible. According to some embodiments, the operating voltage range for a SCM 334 is 400 V DC-1200 V DC or 300 V AC to 850 V AC. In combination with the described SPM 330, a SCM 334 can be powered in a wide range of operating conditions.

Figure 4:
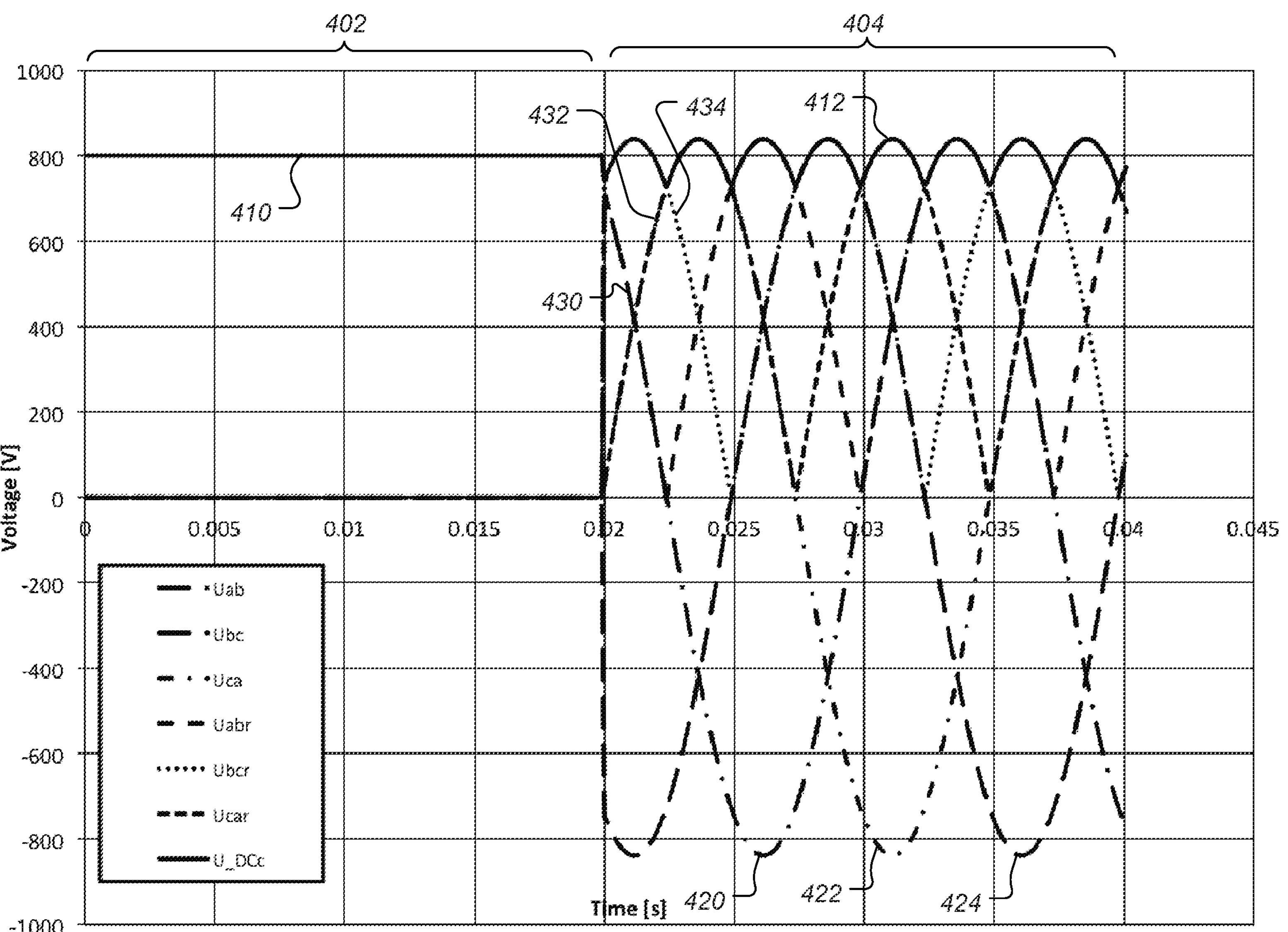
FIG. 4 is a graph illustrating of the off-line DC and on-line rectified AC receiving end voltage, according to some embodiments.

FIG. 4 is a graph illustrating of the off-line DC and on-line rectified AC receiving end voltage, according to some embodiments. In interval 402 on the left side of FIG. 4, curve 410 represents DC auxiliary power supplied through the 3 cable cores in umbilical 132 summed at the subsea transformer neutral point N' (shown in FIG. 3). In interval 404 on the right side of FIG. 4, curve 412 represents the rectified DC voltage from the nodes a', b' and c' shown in FIG. 3. Curves 420, 422 and 424 represent the three phase input waveforms, while curves 430, 432 and 434 represent the rectified versions of three phases. Note that the between the intervals 402 and 404 there would be a transitional interval, which is not shown in FIG. 4, when the switches GS1 (322) and IS1 (312) are closed and opened, respectively, and the main motor power system is energized. According to some embodiments, the auxiliary power requirements during the transitional interval can be supplied by a battery such as battery 336 shown in FIG. 3.

FIG. 5 is a schematic diagram showing further detail of a system for supplying auxiliary power to a remote installation using a common mode AC carrier frequency (CF), according to some embodiments. In FIG. 5, at the topside facility 112 (or other sending location) the topside transformer 108 has been equipped with 5 magnetic legs. The secondary winding has a directly grounded wye-point. The transformer has been equipped with either two or three extra common mode windings 522. The system with two extra common mode coils 522, are placed at the $1^{st}$ and $5^{th}$ legs, as shown in FIG. 5. According to some other embodiments, three common mode coils can be provided which can be placed on the magnetic legs 2, 3 and 4 to induce a zero sequence carrier frequency in the magnetic circuit. In such cases the $1^{st}$ and $5^{th}$ magnetic legs might be passive flux carrying members to allow for zero sequence currents to be induced in the power circuit coils. The carrier frequency power supply unit 510 is shown which applies the auxiliary power to the common mode coils 522 at the carrier frequency. Also shown in FIG. 5 are CF blocking air core inductors 520 which are provided to prevent feedback of the carrier frequency back to the power supply grid. In general there are many other ways to provide such protection or in some cases it might be needed at all (e.g. where the main power is being supplied from a separate generator). Note that the topside primary winding configuration can be freely selected based on the particular project needs.

Note that although the terms “carrier frequency” and “high frequency” are both used in this description—in general the carrier frequency does not need to be very high, and in some cases it does not have to be higher than the main drive frequency. Means can be provided such as air core inductors 520 to prevent feedback to the main power grid which are more effective if the carrier frequency is higher than the main drive frequency but in some cases this is not necessary. One example is where the main power is supplied by a generator. According to some embodiments the carrier frequency is typically below 1 KHz to avoid power loss but in some cases it could be higher than 1 Khz.

These embodiments have benefits of providing galvanic isolation from the HV windings of the transformer. Further, these types of systems can work independently of the main pump motor power circuit. The two topside transformer common mode windings 522 might be used to set up a fixed higher frequency flux in the $1^{st}$ and $5^{th}$ legs of the transformer. The three main transformer legs 524 might form the flux return path for the fixed carrier frequency flux. According to some embodiments, the magnetic configuration can set up a common mode magnetomotive Force (MMF) in all three main magnetic legs, which in turn, will induce an electromotive Force (EMF) in all phases relative to the neutral point. Since the induced voltages are in phase with each other (zero sequence components), when summing the line-to-line voltages, the auxiliary frequency phase voltage will cancel and will not influence the main power.

Figure 6:
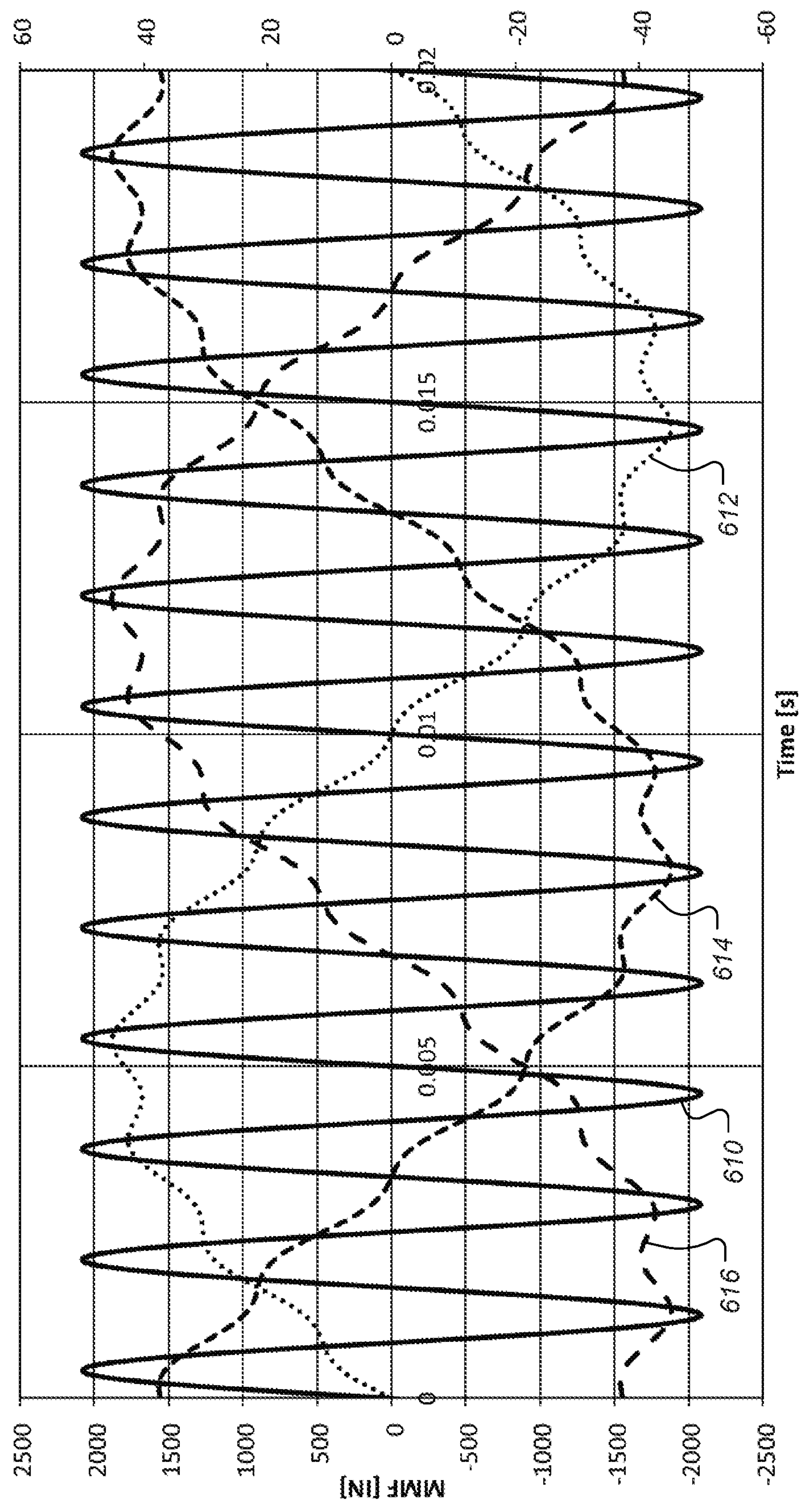
FIGS. 6 and 7 are graphs illustrating magnetomotive force (MMF) and output voltages, respectively, at a topside transformer in a system configured to supply auxiliary power to a remote installation using a common mode carrier frequency, according to some embodiments.
Figure 7:
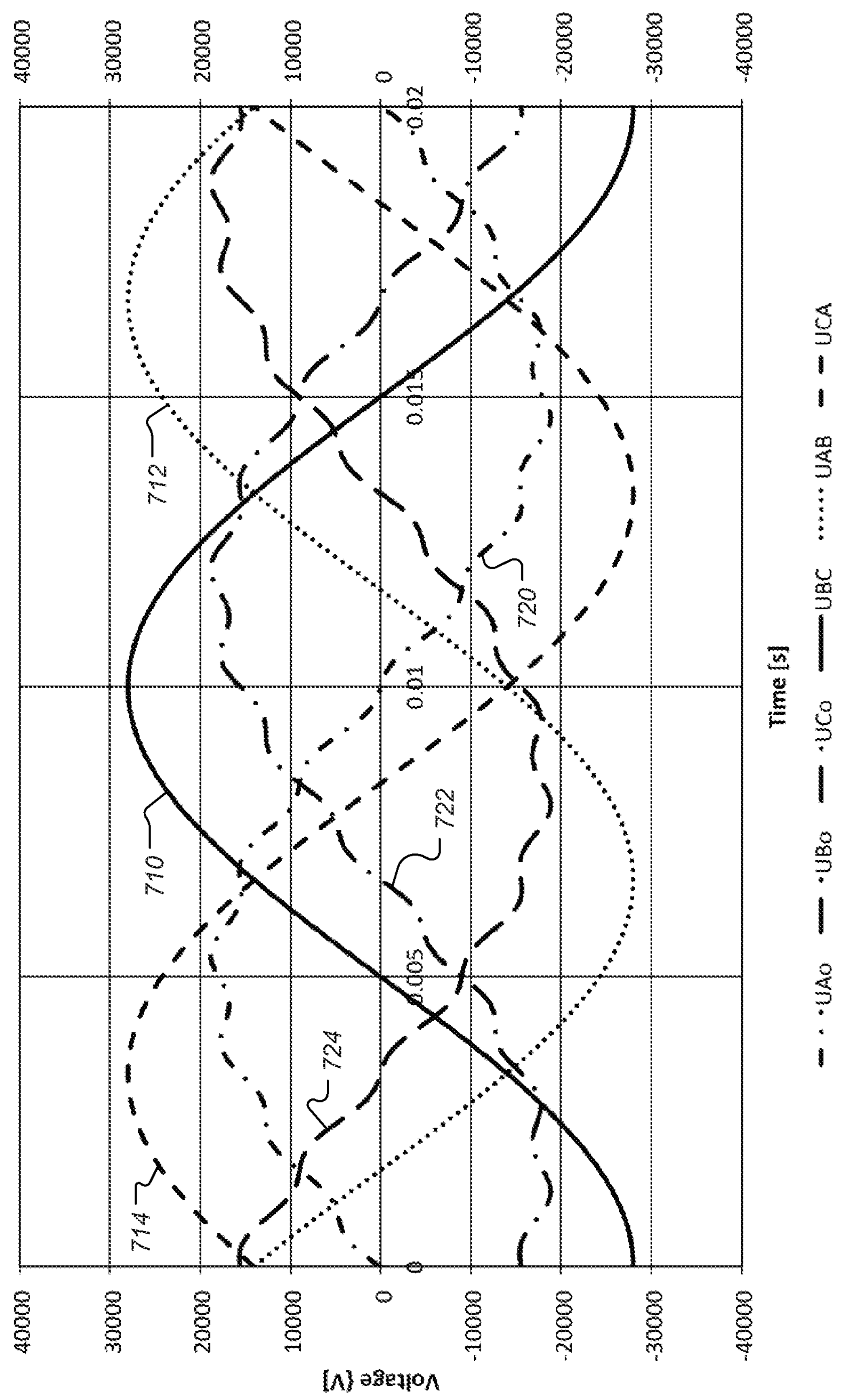

FIGS. 6 and 7 are graphs illustrating magnetomotive force (MMF) and output voltages, respectively, at a topside transformer in a system configured to supply auxiliary power to a remote installation using a common mode carrier frequency, according to some embodiments. In both FIGS. 6 and 7, a 5-leg topside transformer is assumed, such as shown and described with respect to FIG. 5. In FIG. 6, the carrier frequency 5-leg topside transformer flux distribution is shown. Curve 610 represents the carrier MMF, while the curves 612, 614 and 616 represent the MMF for each of the three phases. In FIG. 7, common mode, phase and line output voltages (EMF) from a 5-leg topside transformer are shown. Curves 710, 712 and 714 represent the voltages between phases B to C, A to B and C to A respectively. Curves 720, 722 and 724 represent the voltages between phases A to neutral/GND, B to neutral/GND and C to neutral/GND. As can be seen, the phase-phase voltages are smooth and are not influenced by the superimposed voltage. Accordingly, the performance of the load will not be affected. Note that while the insulation of the system is used to cope with the superimposed voltage added to the main voltage, the relative magnitude will be relatively small and therefore not problematic.

Referring again to FIG. 5, at the remote location 120 the receiving-end transformer 140 can be a 5-leg transformer, similar to the sending-end transformer 108, but with reversed direction of energy flow compared with the sending end transformer 108, for re-generation of the carrier frequency zero sequence current component. According to some embodiments, two additional legs 542 might be used to provide a path for the zero sequence flux resulting from the zero sequence currents. In this configuration, the neutral point of the wye-connected HV winding might be either solidly grounded or grounded through a dedicated network impedance to allow a path to ground for the zero sequence carrier frequency current. The current can either be extracted by induction from leg 1 and 5, from 3 winding coils on the main legs 2, 3 and 4, or directly from the HV winding neutral point. In these embodiments of the disclosure, the auxiliary power system enables to provide galvanic isolation from the HV Power Transmission System, yet using the HV power lines as the energy-transmitting medium. According to some embodiments, an isolation transformer 532 may be included to provide voltage transformation (and further galvanic isolation) between the HV circuit and the subsea power module 520. In case where additional auxiliary voltage levels would be useful in the remote location, one or more additional transformers, such as transformer 534 may be included to provide auxiliary such voltages (such as HF voltage 536).

Note that the far end auxiliary voltage might depend on the turn ratios in both the sending end and receiving end transformers. This provides an extra degree of freedom to use a different voltage level on the auxiliary power for large loads and another voltage for the control system. Further, the auxiliary power might be transmitted at a HV level and a minimum of both voltage and power loss will result from a very long transmission line. A small loss might result from the CF voltage, which also will appear across the HRG resistor 552 if included in the LV circuit. However, depending on the selected turns ratio etc., this loss might be limited to a few hundred watts.

Figure 8:
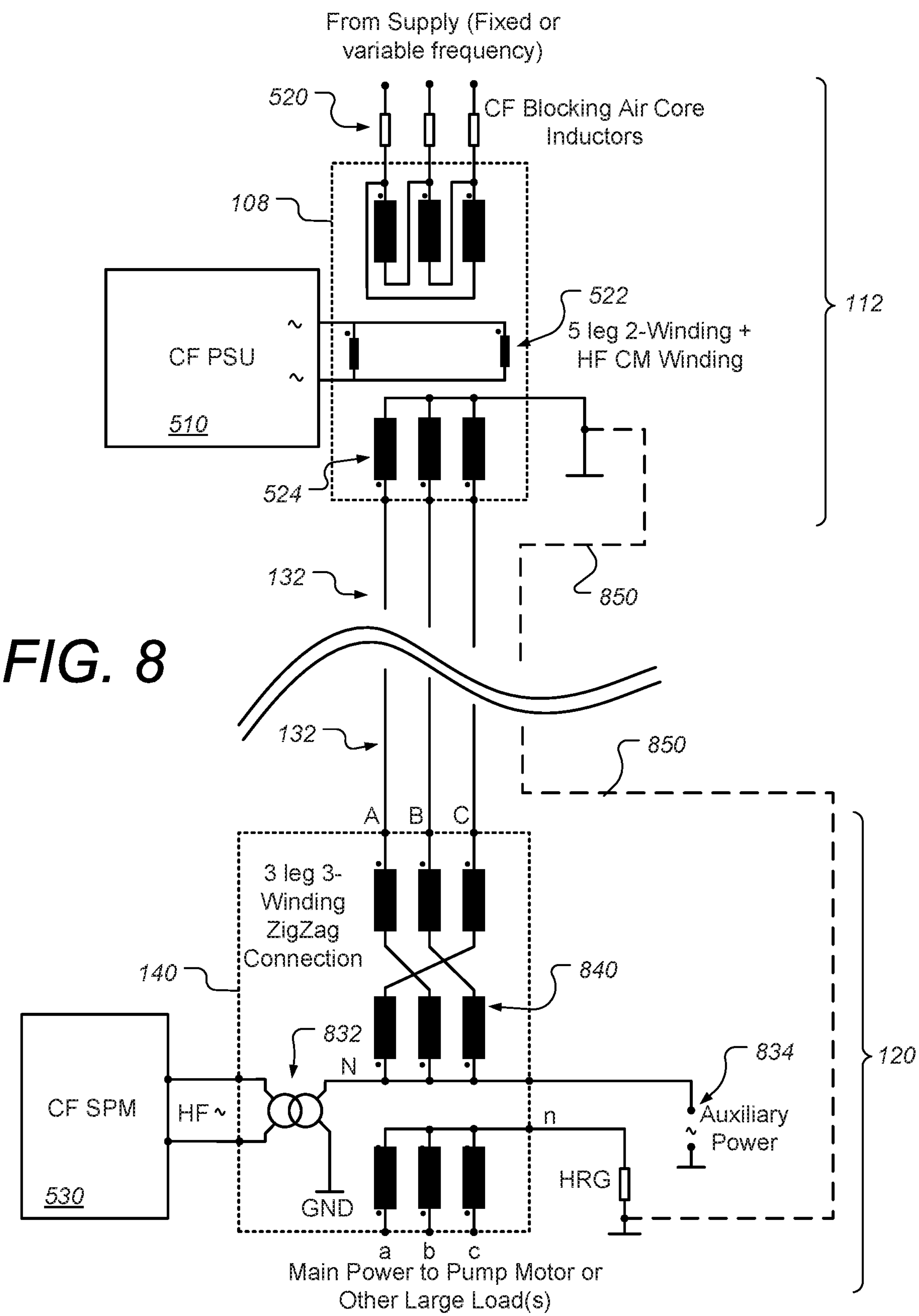
FIG. 8 is a schematic illustrating a system for supplying auxiliary power to a remote installation using a common mode AC carrier frequency (CF), according to some other embodiments.

According to some embodiments of the disclosure, in the CF auxiliary power supply system such as shown in FIGS. 5 and 8, the near end or topside transformer 108 may be either a 5-leg transformer or a 3-leg transformer having a secondary HV winding of zig-zag type. In such cases the common mode coils are provided on each of the magnetic legs 1, 2 and 3 to induce the zero sequence carrier frequency in the magnetic circuit. Similarly, the receiving end transformer 140, that might be placed subsea, may also be either a 5-leg transformer or a 3-leg transformer having a primary HV winding of zig-zag type. The zig-zag alternatives will be described in greater detail infra.

FIG. 8 is a schematic illustrating a system for supplying auxiliary power to a remote installation using a common mode AC carrier frequency (CF), according to some other embodiments. The near-end or topside transformer 108 and PSU 510 are similar or identical to that shown in FIG. 5. In the example of FIG. 8, however, the far-end transformer 140 is a 3-leg configuration with a zig-zag connection which provides a low impedance path for the common mode (zero sequence) currents resulting from the carrier frequency induced voltage topside. Thus, the example shown in FIG. 8 uses a 5-leg sending end transformer combined with a 3-leg zig-zag receiving end transformer. It should be noted that according to some embodiments the topside transformer 108 also may be configured with a zig-zag winding to provide low impedance, zero sequence path from the neutral point into the HV winding. The zig-zag connection might be configured such that the common mode current in one phase leg can be cancelled by the current from the next phase, which is wound in the opposite direction on the same leg, resulting in no net induced flux. In these embodiments, the common mode impedance might be very low and the auxiliary voltage might be available in the common neutral point in the zig-zag winding star connection.

The zig-zag neutral point might be connected to the live input terminal of the isolation transformer 832 feeding the SPM 530. The second input terminal on the isolation transformer 832 might be connected to ground, which comprises the return path for the common mode current. The ground continuity might be provided via seawater, or the umbilical might have one or several screens in addition to the main umbilical armor, where the return current can flow. This path shown optionally as the return line 850. In general, this optional return path can be provided though the umbilical screen(s) or through a dedicated "$4^{th}$ wire" in the umbilical, and is shown in FIGS. 3 and 5 as paths 350 and 550 respectively. In such cases, the subsea-end neutral may not be connected to ground, to ensure that all current flows through the $4^{th}$ wire.

According to some embodiments, the isolation transformer 832 may be omitted or be used to provide galvanic isolation and voltage transformation between the HV circuit and the control system. It might, in a HV fault condition, provide an extra barrier protecting the SCM 530. Where auxiliary power is needed for more power demanding purposes, CF current may be tapped off between the zig-zag neutral point and ground directly as shown by ref. num. 834, or via an isolation transformer (not shown). If a different voltage is required, the isolation transformer 832 may have a turn ratio different from 1:1. In a zig-zag embodiment of the disclosure such as shown in FIG. 8, the far end auxiliary voltage might depend on the turn ratio between the CF windings 522 and the HV winding 524 of the topside transformer 108.

In embodiments of the disclosure, since the common mode current might not result in a net flux in the subsea transformer magnetic legs, no common mode voltage might be induced in the secondary winding feeding the motor. This feature enables to eliminate the potential loss in a HRG resistor in the neutral point.

The proposed embodiments of the disclosure enable to transmit auxiliary power over long distances on the existing low impedance main power cable cores without the need for additional cable elements in the umbilical.

While the subject disclosure is described through the above embodiments, it will be understood by those of ordinary skill in the art, that modification to and variation of the illustrated embodiments may be made without departing from the concepts herein disclosed.

What is claimed is:

1. A system for energizing an auxiliary system supporting operation of a main load, both located at a remote location, the system comprising:

a main power supply system located at a nearby location, wherein the main power supply system transmits main electrical power at a first alternating current (AC) frequency;

three long-distance conductors running between the nearby location and the remote location, the three long-distance conductors supplying high-voltage three-phase electrical power for rotating the main load from the main power supply system;

a step-up transformer at the nearby location increasing a voltage of the three-phase electrical power for transmission over the three long-distance conductors, wherein the step-up transformer comprises five magnetic legs;

a step-down transformer at the remote location decreasing the voltage of the three-phase electrical power from the three long-distance conductors for use by the main load;

an auxiliary power supply system located at the nearby location transmitting auxiliary electrical power at a second AC frequency different than the first AC frequency, wherein the step-up transformer comprises a plurality of additional common mode coils each positioned at a respective leg of the five legs of the step-up transformer, and the auxiliary power supply transmits the auxiliary electrical power to the plurality of additional common mode coils at the second AC frequency; and an auxiliary power extraction system located at the remote location configured to extract the auxiliary electrical power that is transmitted at the second AC frequency on the three long-distance conductors and to energize the auxiliary system with the auxiliary electrical power.

2. The system according to claim 1 wherein the step-up transformer has a neutral node that is grounded at the nearby location.

3. The system according to claim 2 wherein the auxiliary system further comprises actuators for one or more devices located at the remote location.

4. The system according to claim 2 wherein the auxiliary system further comprises equipment configured to monitor one or more parameters at the remote location.

5. The system according to claim 1 wherein the auxiliary system energized by the auxiliary electrical power comprises control electronics.

6. The system according to claim 1 wherein the auxiliary power supply system is further configured:

to energize the auxiliary system prior to energizing the main load by transmitting auxiliary electrical power on the three long-distance conductors; and to energize the auxiliary system while the main load is energized by superimposing auxiliary power on the three-phase electrical power used by the main load.

7. The system according to claim 1 wherein the auxiliary power supply system is further configured to transmit the auxiliary electrical power in zero sequence and at the second AC frequency and the auxiliary power supply system operates independently from the main power supply system.

8. The system according to claim 7 wherein the step-down transformer is configured either as a five-leg transformer or as a 3-leg transformer having secondary high voltage windings arranged in zig-zag layout.

9. The system according to claim 1 wherein the auxiliary power supply system is further configured to transmit the auxiliary electrical power in zero sequence and wherein the second AC frequency comprises a lower frequency than the first AC frequency.

10. The system according to claim 1 wherein the auxiliary power supply system in further configured to transmit at least 1000 watts of auxiliary electrical power.

11. The system according to claim 1 wherein the remote location is a subsea fluid processing station where the main load is configured to drive a subsea pump, compressor or separator, the nearby location is a surface facility, and the three long-distance conductors are housed in one or more power cables running from the surface facility to the subsea fluid processing station.

12. The system according to claim 1 wherein the main load is a main drive motor.

13. The system of claim 1, wherein the plurality of additional common mode coils comprises:

a first additional common mode coil positioned at a first leg of the five legs of the step-up transformer; and a second additional common mode coil positioned at a fifth leg of the five legs of the step-up transformer.

14. A system for energizing an auxiliary system supporting operation of a main load, both located at a remote location, the system comprising:

a main power supply system located at a nearby location, wherein the main power supply system transmits main electrical power at a first alternating current (AC) frequency;

three long-distance conductors running between the nearby location and the remote location, the three long-distance conductors supplying high-voltage three-phase electrical power for rotating the main load from the main power supply system;

a step-up transformer at the nearby location increasing a voltage of the three-phase electrical power for transmission over the three long-distance conductors;

a step-down transformer at the remote location decreasing the voltage of the three-phase electrical power from the three long-distance conductors for use by the main load, wherein the step-down transformer comprises five magnetic legs;

an auxiliary power supply system located at the nearby location transmitting auxiliary electrical power at a second AC frequency different than the first AC frequency; and an auxiliary power extraction system located at the remote location configured to extract the auxiliary electrical power that is transmitted at the second AC frequency on the three long-distance conductors and to energize the auxiliary system with the auxiliary electrical power, wherein the step-down transformer comprises a plurality of additional common mode coils each positioned at a respective leg of the five legs of the step-down transformer, and the auxiliary power extraction system extracts the auxiliary electrical power from the plurality of additional common mode coils.

15. The system of claim 14, wherein the plurality of additional common mode coils comprises:

a first additional common mode coil positioned at a first leg of the five legs of the step-down transformer; and a second additional common mode coil positioned at a fifth leg of the five legs of the step-down transformer.

16. The system of claim 14, wherein the step-up transformer is configured either as a five-leg transformer or as a three-leg transformer having secondary high voltage windings arranged in zig-zag layout.

17. A system for energizing an auxiliary system supporting operation of a main load, both located at a remote location, the system comprising:

a main power supply system located at a nearby location, wherein the main power supply system transmits main electrical power at a first alternating current (AC) frequency;

three long-distance conductors running between the nearby location and the remote location, the three long-distance conductors supplying high-voltage three-phase electrical power for rotating the main load from the main power supply system;

a step-up transformer at the nearby location increasing a voltage of the three-phase electrical power for transmission over the three long-distance conductors;

a step-down transformer at the remote location decreasing the voltage of the three-phase electrical power from the three long-distance conductors for use by the main load;

an auxiliary power supply system located at the nearby location transmitting auxiliary electrical power at a second AC frequency different than the first AC frequency or as a direct current (DC) electrical power on the three long distance conductors, wherein the auxiliary power supply system transmits the auxiliary electrical power to a neutral point of the step-up transformer;

an auxiliary power isolation switch electrically disposed between the auxiliary power supply system and the neutral point of the step-up transformer, wherein the auxiliary power isolation switch is configured to block transmission of the auxiliary electrical power from the auxiliary power supply system to the neutral point of the step-up transformer while the auxiliary power isolation switch is open, and the auxiliary power isolation switch is configured to enable transmission of the auxiliary electrical power from the auxiliary power supply system to the neutral point of the step-up transformer while the auxiliary power isolation switch is closed;

a neutral grounding switch electrically disposed between the neutral point of the step-up transformer and a ground, wherein the neutral grounding switch is configured to electrically isolate the neutral point of the step-up transformer from the ground while the neutral grounding switch is open, and the neutral grounding switch is configured to electrically couple the neutral point of the step-up transformer and the ground while the neutral grounding switch is closed; and an auxiliary power extraction system located at the remote location configured to extract the auxiliary electrical power that is transmitted at the second AC frequency or as the DC electrical power on the three long-distance conductors and to energize the auxiliary system with the auxiliary electrical power, wherein the auxiliary power extraction system extracts the auxiliary electrical power from a neutral point of the step-down transformer only while the neutral grounding switch is open and the auxiliary power isolation switch is closed.

18. The system of claim 17, comprising an interlock configured to block the auxiliary power isolation switch and the neutral grounding switch from being closed at the same time.

19. The system of claim 17, comprising a battery configured to energize the auxiliary system during transient conditions.

20. The system of claim 17, wherein the step-down transformer has an auxiliary winding, and the auxiliary winding is configured to energize the auxiliary system while the neutral grounding switch is closed and the auxiliary power isolation switch is open.

* * * * *